United States Patent [19]

Schreckenberg et al.

[11] 4,169,868
[45] Oct. 2, 1979

[54] PROCESS FOR THE PREPARATION OF NEW HIGH-MOLECULAR SEGMENTED POLYESTER-POLYCARBONATES WHICH CAN BE PROCESSED BY THERMOPLASTIC METHODS AND NEW POLYESTER-POLYCARBONATES OBTAINED ACCORDING TO THE PROCESS

[75] Inventors: Manfred Schreckenberg, Krefeld; Klaus König, Leverkusen; Dieter Freitag; Volker Serini, both of Krefeld, all of Fed. Rep. of Germany

[73] Assignee: Bayer Aktiengesellschaft, Leverkusen, Fed. Rep. of Germany

[21] Appl. No.: 816,567

[22] Filed: Jul. 18, 1977

[30] Foreign Application Priority Data

Aug. 16, 1976 [DE] Fed. Rep. of Germany ....... 2636783

[51] Int. Cl.$^2$ .................... C08G 63/62; C08G 63/24
[52] U.S. Cl. ................... 525/439; 528/176; 528/177; 525/413; 525/462; 525/472; 525/535
[58] Field of Search ................... 260/860, 47 XA; 528/176, 177

[56] References Cited

U.S. PATENT DOCUMENTS

| | | | |
|---|---|---|---|
| 3,207,814 | 9/1965 | Goldberg | 260/860 |
| 3,287,442 | 11/1966 | Caldwell et al. | 260/860 |
| 3,367,993 | 2/1968 | Caldwell et al. | 260/860 |
| 3,409,704 | 11/1968 | Bailey | 260/860 |
| 3,419,635 | 12/1968 | Vaughn | 260/824 |
| 3,461,187 | 8/1969 | Cantrill | 260/873 |
| 3,641,200 | 2/1972 | Matzner | 260/860 |
| 3,843,708 | 10/1974 | Matzner | 260/463 |
| 4,001,184 | 1/1977 | Scott | 528/176 |

OTHER PUBLICATIONS

Journal of Polymer Science, vol. 55, Goldberg, pp. 707-730.

Primary Examiner—John C. Bleutge
Attorney, Agent, or Firm—Gene Harsh; Lawrence S. Pope

[57] ABSTRACT

The subject of the present invention is a process for the preparation of new high-molecular weight polyester-polycarbonates which contain incorporated segments containing carboxyl groups and can be processed by thermoplastic methods, which process is characterized in that segments which contain carboxyl groups and have average molecular weights $\overline{M}n$ (number-average of the molecular weight determined via the acid number of the segments containing carboxyl groups) of greater than about 600, preferably of greater than about 800 and in particular of between about 1,000 and 20,000, are reacted with diphenols and phosgene by the known two-phase boundary polycondensation process at a pH value of between about 9 and 14 and at a temperature of between about 0° C. and 80° C. and preferably of between about 15° C. and 40° C. and the resulting reaction products are either subjected to a heat treatment at temperatures of between about 40° C. and 170° C. for between about 5 minutes to 24 hours or are subjected, at temperatures of between about 130° C., and 250° C., to shear forces of between about 720 and 2520 kJ/kg of polymer or are gelled in solution by organic solvents. The invention also relates to the polyester-polycarbonates which are obtainable according to the invention and contain at least 2 phases, resulting from the polycarbonate constituent and the segment fraction which has terminal carboxyl groups.

8 Claims, No Drawings

PROCESS FOR THE PREPARATION OF NEW HIGH-MOLECULAR SEGMENTED POLYESTER-POLYCARBONATES WHICH CAN BE PROCESSED BY THERMOPLASTIC METHODS AND NEW POLYESTER-POLYCARBONATES OBTAINED ACCORDING TO THE PROCESS

BACKGROUND OF THE INVENTION

The reaction of dicarboxylic acids in a non-aqueous medium by the so-called "pyridine process" is known (DT-OS (German Published Specification) No. 1,495,912, U.S. Pat. No. 3,030,331, DT-OS (German Published Specification) No. 1,420,476 and U.S. Pat. No. 3,220,976).

The reaction of dicarboxylic acids by the so-called "transesterification process" is also known (DT-OS (German Published Specification) No. 1,420,475, U.S. Pat. No. 3,169,121 and U.S. Pat. No. 3,207,814).

The reaction of dicarboxylic acids by the so-called "suspension process" using inert organic liquids is also known (DT-OS (German Published Specification) No. 1,495,906 and U.S. Pat. No. 3,290,409).

The reaction of dicarboxylic acid halides by the two-phase boundary process is also known (U.S. Pat. No. 3,207,814, column 6, lines 60 to 65).

All of these process variants for incorporating ester groupings in polycarbonates have disadvantages either because of the process conditions or because of the properties of the polyester-carbonates obtainable by these processes.

SUMMARY OF THE INVENTION

The subject of the present invention is a process for the preparation of new high-molecular weight polyester-polycarbonates which contain incorporated segments containing carboxyl groups and can be processed by thermoplastic methods, which process is characterized in that segments which contain carboxyl groups and have average molecular weights $\overline{M}n$ (number-average of the molecular weight determined via the acid number of the segments containing carboxyl groups) of greater than about 600, preferably of greater than about 800 and in particular of between about 1,000 and 20,000, and reacted with diphenols and phosgene by the known two-phase boundary polycondensation process at a pH value of between about 9 and 14 and at a temperature of between about 0° C. and 80° C. and preferably of between about 15° C. and 40° C. and the resulting reaction products are either subjected to a heat treatment at temperatures of between about 40° C. and 170° C. for between about 5 minutes to 24 hours or are subjected, at temperatures of between about 130° C. and 250° C., to shear forces of between about 720 and 2520 kJ/kg of polymer are gelled in solution by organic solvents. The invention also relates to the polyester-polycarbonates which are obtainable according to the invention and contain at least 2 phases, resulting from the polycarbonate constituent and the segment fraction which has terminal carboxyl groups.

DETAILED DESCRIPTION OF THE INVENTION

The process according to the invention was not foreseeable because, under comparable conditions, the majority of the dicarboxylic acids which have molecular weights $\overline{M}n$ of less than about 600, such as terephthalic acid, phthalic acid or adipic acid, do not undergo co-condensation.

When they are built up from segments containing purely aliphatic carboxyl groups, diphenols and phosgene, the high-molecular weight, segmented polyester-polycarbonates which can be processed by thermoplastic methods and are obtained by the process according to the invention are, depending on the degree of crystallization of the polycarbonate constituent, transparent to opaque and highly elastic and display an outstanding elongation at break.

The polyester-polycarbonates which are obtained from segments containing aliphatic-aromatic carboxyl groups or purely aromatic carboxyl groups, diphenols and phosgene and are obtained by the process according to the invention are transparent to opaque and have a lower elasticity, compared with that of the polyester-polycarbonates obtained from segments containing purely aliphatic carboxyl groups.

Segments which contain carboxyl groups, that is to say which contain—COOH, and have a $\overline{M}n$ (number-average) of greater than about 600, preferably of greater than about 800 and especially of between about 1,000 and 20,000 and are suitable according to the invention are to be understood as those compounds which contain at least one—COOH group, preferably have 1 to 4—groups, but most preferably have 2—COOH and include the following types of compounds:

(1) Polyesters which have—COOH end groups and are prepared, for example, by reactions, which are known from the literature, of polyhydric, preferably dihydric and optionally additionally trihydric alcohols with polybasic, and preferably dibasic, carboxylic acids. The corresponding polycarboxylic acid anhydrides or the polycarboxylic acid esters of lower alcohols can also be used in place of the free polycarboxylic acids for the preparation of these polyesters.

The polybasic carboxylic acids can be of aliphatic, cycloaliphatic, aromatic and/or heterocyclic character and can optionally be substituted, for example by halogen atoms, and/or unsaturated. Examples of such acids which may be mentioned are: succinic acid, adipic acid, suberic acid, azelaic acid, sebacic acid, phthalic acid, isophthalic acid, terephthalic acid, trimellitic acid, phthalic anhydride, tetrahydro- or hexahydro-phthalic anhydride, tetrachlorophthalic anhydride, endomethylenetetrahydrophthalic anhydride, glutaric anhydride, maleic acid, maleic anhydride, fumaric acid and dimeric and trimeric fatty acids, such as oleic acid, optionally mixed with monomeric fatty acids. Examples of polyhydric alcohols which can be used are ethylene glycol, propylene-1,2- and -1,3-glycol, butylene-1,4- and -2,3-glycol, hexane-1,6-diol, octane-1,8-diol, neopentylglycol, cyclohexanedimethanol (1,4-bis-hydroxymethylcyclohexane), 2-methyl-1,3-propanediol, glycerol, trimethylolpropane, hexane-1,2,6-triol, butane-1,2,4-triol, trimethylolethane, pentaerythritol, quinitol and also diethylene glycol, thiodiglycol, triethylene glycol, tetraethylene glcyol, polyethylene glycols, dipropylene glycol, polypropylene glycols, dibutylene glycol and polybutylene glycols. The content of carboxyl end groups and, thus, the $\overline{M}n$ "number-average" molecular weight, are determined by the choice of the defined acid excess. Preferably, polyesters obtained from aliphatic starting components are employed.

(2) Polyesters which are prepared by polymerization of a lactone, for example of ε-caprolactone, or by a condensation reaction of a hydroxycarboxylic acid, for example of ω-hydroxy-caproic acid, with a starter containing carboxyl groups. $\overline{M}n$ is obtained by calculation, as described under (1) above.

(3) Polyesters which contain hydroxyl groups and can be prepared, for example, by methods known from the literature using the reactants mentioned under (1) above, but using an excess of polyhydric alcohols, and which contain at least one, preferably 1 to 4, and most preferably 2 hydroxyl groups and are converted, by reaction with cyclic dicarboxylic acid anhydrides, into the polyesters which contain —COOH groups and are suitable according to the invention. The average molecular weight $\overline{M}n$ of the polyesters containing hydroxyl groups, which can be determined by the OH number of these polyesters, is so chosen that the polyesters which contain carboxyl and have a $\overline{M}n$ of greater than about 600 and are to be employed according to the invention are obtained after acylation with the cyclic dicarboxylic acid anhydrides.

Examples of cyclic dicarboxylic acid anhydrides which are suitable for acylating the polyesters containing hydroxyl groups are maleic anhydride, succinic anhydride, glutaric anhydride, phthalic anhydride, tetrahydro- and hexahydro-phthalic anhydride, tetrachlorophthalic anhydride and endomethylenetetrahydrophthalic anhydride.

(4) Polyethers which are prepared by anionic or cationic homopolymerization of epoxides such as ethylene oxide, propylene oxide, butylene oxide, tetrahydrofurane, styrene oxide or epichlorohydrin, for example in the presence of $BF_3$, or by an addition reaction of these compounds, optionally as a mixture or successively, with starting components which have reactive hydrogen atoms, such as alcohols or amines, that is to say, for example, with water, ethylene glycol, propylene-1,3- or 1,2-glycol, trimethylolpropane, 4,4-dihydroxydiphenylpropane, aniline, ammonia, ethanolamine or N-methylethanolamine. The polyethers prepared in this way have at least one hydroxyl group, preferably 1 to 4 hydroxyl groups and most preferably 2 hydroxyl groups. The molecular weights of the polyethers are so controlled, by known processes, that the compounds which contain carboxyl and have a $\overline{M}n$ greater than about 600 and which are to be employed according to the invention are obtained after acylation with cyclic dicarboxylic acid anhydrides, as described under (3) above.

(5) Polythioethers which are prepared by subjecting thiodiglycol and an acid condensation reaction on its own or with other diols, such as, for example, hexane-1,6-diol, and which have at least one hydroxyl group, preferably 1 to 4 hydroxyl groups and most preferably 2 hydroxyl groups and the molecular weights of which are so controlled, by known processes, that the compounds which contain carboxyl and have a $\overline{M}n$ greater than about 600 and are to be employed according to the invention are obtained after acylation with cyclic dicarboxylic acid anhydrides, as described under (3) above.

(6) Polyacetals, which are prepared by subjecting diols, such as, for example, diethylene glycol, triethylene glycol, butane-1,4-diol or hexane-1,6-diol, to an acid condensation reaction with aliphatic aldehydes, such as, for example, formaldehyde or acetaldehyde, and which have at least one hydroxyl group, preferably 1 to 4 hydroxyl groups and most preferably 2 hydroxyl groups and the molecular weights of which are so controlled, by known methods, that the compounds which contain carboxyl and have a $\overline{M}n$ greater than about 600 and are to be employed according to the invention are obtained after acylation with cyclic dicarboxylic acid anhydrides, as described under (3) above.

(7) Aliphatic polycarbonates which are prepared from glycols, such as di-, tri- and tetra-ethylene glycol, hexane-1,6-diol, butane-1,4-diol or dodecane-1,12-diol, by transesterification with diethyl carbonate or diphenyl carbonate or by reaction with phosgene and which have at least one hydroxyl group, preferably 1 to 4 hydroxyl groups and most preferably 2 hydroxyl groups and the molecular weights of which are so controlled, by known methods, that the compounds which contain carboxyl and have a $\overline{M}n$ greater than about 600 and are to be employed according to the invention are obtained after acylation with cyclic dicarboxylic acid anhydrides, as described for (3) above.

Suitable diphenols for the process according to the invention are: hydroquinone, resorcinol, dihydroxydiphenyls, bis-(hydroxyphenyl)-alkanes, bis-(hydroxyphenyl)-cycloalkanes, bis-(hydroxyphenyl) sulphides, bis-(hydroxyphenyl) ethers, bis-(hydroxyphenyl) ketones, bis-(hydroxyphenyl) sulphoxides, bis-(hydroxyphenyl) sulphones and α,α-bis-(hydroxyphenyl)diisopropylbenzenes as well as their compounds which are alkylated in the nucleus and halogenated in the nucleus. These compounds and further suitable aromatic dihydroxy compounds are described, for example, in U.S. Pat. Nos. 3,028,365, 2,999,835, 3,148,172, 3,271,368, 2,991,273, 3,271,367, 3,280,078, 3,014,891 and 2,999,846.

Examples of preferred diphenols are: 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)cyclohexane, α,α-bis-(4-hydroxyphenyl)-p-diisopropylbenzene, 2,2-bis-(3-chloro-4-hydroxyphenyl)-propane, 2,2-bis-(3,5-dichloro-4-hydroxyphenyl)-propane and 2,2-bis-(3,5-dibromo-4-hydroxyphenyl)-propane.

Examples of particularly preferred diphenols are: 2,2-bis-(4-hydroxyphenyl)-propane, 2,2-bis-(3,5-dichloro-4-hydroxyphenyl)-propane, 2,2-bis-(3,5-dibromo-4-hydroxyphenyl)propane and 1,1-bis-(4-hydroxyphenyl)-cyclohexane.

Any desired mixtures of the above-mentioned diphenols can also be used.

Branched products which have better flow characteristics during processing are obtained by incorporating small amounts of compounds which are trifunctional or have more than three functional groups, especially those compounds which have three or more than three phenolic hydroxyl groups, in an amount of, preferably about 0.05–2.0 mol % (relative to the total mols of diphenols employed). Examples of suitable compounds which are trifunctional or have more than three functional groups are: phloroglucinol, 4,6-dimethyl-2,4,6-tri-(4-hydroxyphenyl)-hept-2-ene, 4,6-dimethyl-2,4,6-tri(4-hydroxyphenyl)-heptane, 1,3,5-tri-(4-hydroxyphenyl)benzene, 1,1,1-tri-(4-hydroxyphenyl)-ethane, tri-(4-hydroxyphenyl)-phenylmethane, 2,2-bis-[4,4-(4,4'-dihydroxydiphenyl)cyclohexyl]-propane, 2,4-bis-(4-hydroxyphenylisopropyl)-phenol, 2,6-bis-(2'-hydroxy-5'-methylbenzyl)-4-methyl-phenol, 2,4-dihydroxybenzoic acid, 2-(4-hydroxyphenyl)-2-(2,4-dihydroxyphenyl)-propane and 1,4-bis-(4',4''-dihydroxytriphenyl-methyl)-benzene and also 3,3-bis-(4-hydroxyphenyl)-2-oxo--dihydroxytriphenyl-methyl)benzene -dihydroindole.

Branched products can, of course, also be obtained via the above mentioned carboxyl groups containing segments having three or more COOH—groups.

The chain length of the polyester-polycarbonates can be adjusted by adding a chain stopper, for example a monofunctional phenol, such as phenol, 2,6-dimethylphenol or p-tert.-butyl-phenol, and it is possible to employ between about 0.1 and 10 mol% of chain stopper per mol of diphenol.

The chain length of the polyester-polycarbonates can, of course, also be adjusted via the above mentioned segments containing one COOH—group.

The high-molecular, segmented polyester-polycarbonates which can be processed by thermoplastic methods are prepared by the two-phase boundary polycondensation process. For this purpose one of the above-mentioned diphenols is dissolved, or mixtures of the above-mentioned diphenols are dissolved, in an aqueous-alkaline phase. The above-mentioned segments containing—COOH, or mixtures thereof, are likewise dissolved in an organic solvent which is immiscible with water and this solution is added to the first solution. Phosgene is then passed in at a temperature of between about 0° C. and 80° C. and preferably of between about 15° C. and 40° C. and at a pH value of between about 9 and 14. After phosgenation, the polycondensation reaction is carried out by adding about 0.2–5 mol %, relative to the mol amount of diphenol, of a tertiary aliphatic amine. With this process times of between about 5 minutes and 3 hours, and especially of between about 10 minutes and 2 hours, are required for the phosgenation and times of between about 3 minutes and 3 hours, and preferably of between about 5 and 60 minutes, are required for the polycondensation reaction.

The resulting solutions of the polyester-polycarbonates in the organic solvents are worked up analogously to the solutions of thermoplastic polycarbonates prepared by the two-phase boundary process; i.e., the polyester-polycarbonates are either (a) isolated by known processes, for example by precipitation with methanol or ethanol, and then dried and heat-treated or subjected to shear forces or, when dissolved in organic solvents, allowed to gel, or (b) already subjected to shear forces during isolation, for example in a devolatilization extruder, or (c) allowed to gel, prior to isolation, in the solvent used for the preparation of the polyester-polycarbonates by the two-phase boundary process.

Suitable organic solvents for the two-phase boundary process are water-immiscible chlorinated hydrocarbons, such as methylene chloride, chloroform and 1,2-dichloroethane, but also chlorinated aromatic compounds, such as chlorobenzene, dichlorobenzene and chlorotoluene, or mixtures of the above-mentioned solvents.

Solutions which are suitable as the aqueous-alkaline phase are solutions of $Li(OH)_2$, NaOH, KOH, $Ca(OH)_2$ and/or $Ba(OH_2)$ in water.

Suitable tertiary aliphatic amines are those with 3 to 15 carbon atoms, that is to say, for example, trimethylamine, triethylamine, n-tripropylamine and n-tributylamine.

The polyester-polycarbonates can be isolated in the following ways:

(a) By distilling off the organic solvent until a specific concentration is reached, a high percentage strength (about 30–40% by weight) polymer solution is obtained. On subsequent slow evaporation of the residual solvent, the polyester-polycarbonate gels.

(b) By precipitating the polyester-polycarbonates from the organic phase with organic solvents. Examples of suitable solvents for effecting precipitation are methanol, ethanol, isopropanol, acetone, aliphatic hydrocarbons and cycloaliphatic hydrocarbons.

If the polyester-polycarbonates are isolated in a devolatilization extruder, this can be effected at temperatures of about 160°–240° C. under the conditions known for polycarbonate extrusion and with the application of shear forces.

Gelling of the polyester-polycarbonates is effected by cooling a high percent strength polymer solution, irrespective of whether it is carried out in the organic phase which has been worked up of the two-phase reaction mixture without isolation of the product or in a separate solution of the previously isolated polyester-polycarbonates in organic solvents, and, depending on the polyester constituent or the polycarbonate constituent, between about 5 minutes and 12 hours at temperatures of between about 0° C. and 40° C. are required for gelling.

The gelled product can be worked up to give a granular mixture, the resulting polyester-polycarbonate being dried for about 48 hours at about 50° C. and for about 24 hours at about 100° C. in vacuo.

Suitable solvents for separate gelling of polyester-polycarbonates which have been isolated are methylene chloride, benzene, toluene, xylene, chlorobenzene and further organic solvents.

Heat-treatment of the polyester-polycarbonates which have been isolated is carried out for between about 5 minutes and 24 hours at temperatures of between about 40° C. and 170° C.

Shear forces are brought to act on the polyester-polycarbonates, which have been isolated, for between about 5 and 30 minutes, at temperatures between about 130° and 250° C., using shear forces of between 720 and 2520 kJ/kg of polymer.

The reaction, according to the invention, of segments containing-COOH, diphenols and phosgene by the two-phase boundary polycondensation process takes place virtually quantitatively, so that the composition of the polyester-polycarbonates can be determined by the choice of the reactant ratio (expressed in % by weight)-=segment containing-COOH to diphenol.

Thus, for example, for the preparation, according to the invention, of polyester-(bisphenol-A polycarbonates), the reactant ratio of the segment containing—COOH to bisphenol A is generally between about 70–5% by weight to about 27–85% by weight and preferably between about 65–20% by weight to about 31.5–72% by weight.

The molar reactant ratio of the dicarboxylic acid to phosgene is about 1:5 and preferably about 1:3.

The amount of phosgene depends on the dicarboxylic acid employed, the diphenol employed, the stirring effect and the reaction temperature which can be between about 0° C. and about 80° C.

The molar reactant ratio of diphenol to phosgene is generally about 1:1.5.

Thus, depending on the desired spectrum of properties, the polycarbonate content in the polyester-polycarbonates prepared by the process according to the invention can be between about 30 and 95%, and preferably between about 35 and 80% by weight, the hardness and the heat distortion point increasing and the elasticity and elongation at break decreasing as the polycarbonate content increases.

The high-molecular statistically segmented polyester-polycarbonates which can be processed by thermoplastic methods and are prepared by the process according to the invention are characterized in that the polyester constituent is in the amorphous form and has a glass transition point, determined by means of differential thermal analysis, of between about $-100°$ C. and $+100°$ C. and preferably of between about $-80°$ C. and $+20°$ C. and that the polycarbonate constituent is partly crystalline, the crystalline polycarbonate constituent having a crystallite melting point of at least about 160° C. and preferably of between about 165° C. and 250° C., and in that the glass transition point of the amorphous polycarbonate constituent is above about 80° C. and preferably above about 100° C.

This differentiation between the glass transition point of the polyester constituent and the glass transition point and the crystallite melting point of the polycarbonate constituent is a characteristic indication of phase separation between the polyester constituent and the polycarbonate constituent.

The polyester-polycarbonates according to the invention should have average molecular weights $\overline{M}w$ (weight-average) of about 25,000 to 200,000 and preferably of about 35,000 to 100,000, determined by the light scattering method with a dispersion photometer.

The relative solution viscosity $\eta$ rel (measured on 0.5 g in 100 ml of $CH_2Cl_2$ at 25° C.) should be between about 1.3 and 2.4 and preferably between about 1.4 and 1.8.

The partial crystallinity, which can be demonstrated by a measurable enthalpy of melting of the polycarbonate constituent of the polyester-polycarbonates prepared according to the invention, this enthalpy being at least about 4.19–33.48 kJ/kg of polymer, can be further increased by about 50% by elongation and subsequent heat treatment (about 5 minutes to 25 hours) at about 40°–170° C., which has been mentioned, or by the action of shear forces, which has been mentioned, during thermoplastic processing in a multi-screw extruder, and this results in an increase in the heat distortion point of the products and in the appearance changing from transparent to opaque to non-transparent.

The partially crystalline, elastic polyester-polycarbonates can all be processed by thermoplastic methods below or in the region of the crystallite melting point of the crystalline polycarbonate constituent at temperatures of between about 130° and 250° C., and no significant proportion of the crystallinity is lost. At processing temperatures above the crystallite melting point of the crystalline polycarbonate constituent, amorphous, transparent products are obtained.

It is thus possible to vary the proportion of crystalline polycarbonate in the polycarbonate constituent of the polyester-polycarbonates according to the invention and, in order for the polyester-polycarbonates to have a good heat distortion point for practical purposes, this crystalline proportion having an enthalpy of melting of 4.19–33.48 kJ/kg of polymer and preferably about 10.46–23.01 kJ/kg of polymer.

The stability to UV light and the stability to hydrolysis of the polyester-polycarbonates prepared according to the invention can be improved by UV stabilizers, such as, for example, substituted benzophenones or benztriazoles, in amounts customary for thermoplastic polycarbonates, by agents which provide protection against hydrolysis, such as, for example, monocarbodiimides and, above all, polycarbodiimides, (compare W. Neumann, J. Peter, H. Holtschmidt and W. Kallert, Proceeding of the 4th Rubber Technology Conference, London, 22nd–25th May 1962. pages 738–751) in amounts of about 0.2–5% by weight, relative to the polyester-polycarbonate, and by anti-aging agents known in the chemistry of thermoplastic polyesters and thermoplastic polycarbonates.

In order to modify the products according to the invention it is possible to add substances such as, for example, carbon black, kieselguhr, kaolin, clays, $CaF_2$, $CaCO_3$, aluminum oxides and also conventional glass fibers in amounts of about 2 to 40% by weight, in each case relative to the total weight, and inorganic pigments, both as fillers and as nucleating agents.

If flame-resistant products are desired, about 5 to 15% by weight, relative to the polyester-polycarbonate, of flame-proofing agents known in the chemistry of thermoplastic polyesters and thermoplastic polycarbonates, such as, for example, antimony trioxide, tetrabromophthalic anhydride, hexabromocyclododecane, tetrachloro- or tetrabromo-bisphenol or tris-(2,3-dichloropropyl) phosphate can be mixed in, and tetrachlorobisphenols and tetrabromobisphenols statistically incorporated into the polycarbonate blocks of the polyester-polycarbonates also impart flame-resistant characteristics.

Furthermore, processing auxiliaries known in the chemistry of thermoplastic polyesters and thermoplastic polycarbonates, such as mold release auxiliaries, can be used in an effective manner.

The polyester-polycarbonates obtained by the process according to the invention can advantageously be employed wherever a combination of hardness (due to the polycarbonate segment) and elasticity (due to the segment containing carboxyl groups) and in particular of low-temperature flexibility (due to a segment containing purely aliphatic carboxyl groups) is desired, for example in bodywork engineering, for the production of low-pressure tires for vehicles, for sheathings for hoses, plates and pipes and for flexible drive pulleys.

EXAMPLES

EXAMPLES A 1 TO A 14

Preparation of the segments containing—COOH

The segments containing—COOH are prepared by technically customary processes.

The polyesters are preferably prepared by a condensation reaction in the melt, the water of condensation being distilled off, first under normal pressure and then under reduced pressure.

An entraining agent, such as, for example, benzene, toluene and the like, can also be used to remove the water from the esterification equilibrium.

It can be useful to use customary catalysts, especially when preparing polyesters with average molecular weights of above about 4,000. The average molecular weight is determined by the number of recurring structural units and by a defined acid excess: n mols of diol and (n+1) mols of dicarboxylic acid are employed per mol of a bifunctional polyester. Assuming that esterification is complete, the calculated molecular weight $\overline{M}n$ is [n×(molecular weight of the diol+molecular weight of the dicarboxylic acid−36(+molecular weight of th dicarboxylic acid].

$\overline{M}n$ is determined from the analytically determined acid number of the segment containing—COOH in accordance with the following equation: The average molecular weight $\overline{M}n$ can be determined via the acid number as follows:

$$\overline{M}n = \frac{1,000 \times f \times 56.1}{\text{acid number}}$$

f=number of functional groups $\overline{M}n$ is determined in the same way from the analytically determined hydroxyl number of the segments containing hydroxyl groups (polyesters, polyethers, polythioethers, polyacetals and aliphatic polycarbonates), the OH number being employed in place of the acid number.

In the text which follows, some of the segments containing—COOH are described by way of example:

A-1

2,124 g (18 mols) of hexane-1,6-diol were mixed with 2920 g (20 mols) of adipic acid and the mixture was heated under nitrogen. Above 150° C., water of condensation started to distil off through a column. The temperature was raised to 200° C. in the course of 5 hours and the mixture was kept at this temperature for a further 2 hours. After adding 50 mg of $SnCl_2.2H_2O$, the supply of nitrogen was ceased and the pressure was gradually lowered to 15 mm Hg in the course of 3 hours. After a further 15 hours at 200° C. and under 15 mm Hg the condensation reaction had ended. A wax with a softening point of 44°-48° C. and with an acid number of 54 and a OH number of 1.5, corresponding to an average molecular weight $\overline{M}n$ of about 2,000, was obtained.

A-2

2,124 g (18 mols) of hexane-1,6-diol were subjected to a condensation reaction with 3,504 g (24 moles) of adipic acid in the manner described under A-1 and a polyester with an acid number of 136 and a OH number of 1.0 (corresponding to an average molecular weight $\overline{M}n$ of about 820) was obtained.

A-3

1,800 g (20 mols) of butane-1,4-diol were subjected to a condensation reaction with 3,212 g (22 mols) of adipic acid as follows: for 5 hours at 150° C. under normal pressure, for 5 hours under 100 mm Hg, the temperature gradually being raised to 200° C., and for 15 hours at 200° C./15mm Hg. The OH number of the polyester was now 2. A white wax was obtained. (Softening point≅40° C.). The acid number was 61.2 ($\overline{M}n \cong 1,780$).

A-4

A hexanediol-polyadipate with an acid number of 89.5 and a OH number of 1.5 was prepared, analogously to A-1, from 2,065 g (17.5 mols) of hexane-1,6-diol and 3,066 g (21 mols) of adipic acid ($\overline{M}n \cong 1,230$).

A-5

1,364 g (22 mols) of ethylene glycol were subjected to a condensation reaction, analogously to A-3, with 3,504 g (24 mols) of adipic acid, 30 mg of titanic acid tetrabutyl ester being added as a catalyst. A wax-like polyester with an acid number of 56.8 and a OH number of 2 ($\overline{M}n \cong 1,900$) was obtained.

A-6

A viscous polyester with an acid number of 63 and a OH number of 0.5 ($\overline{M}n \cong 1,750$) was obtained from 1,520 g (20 mols) of propylene 1,2-glycol and 3,512 g (22 mols) of adipic acid by a condensation reaction in the melt at 200° C. and under 15 mm Hg (30 hours).

A-7

2,210 g (21.25 mols) of neopentylglycol were mixed with 3,465 g (23.75 mols) of adipic acid. After adding 500 ml of toluene, the mixture was heated to the boil and the water of condensation, which distills off as an azeotrope, was separated off via a water separator. The condensation temperature was kept at 160°-180° C. by adding or removing toluene. After 24 hours the esterification reaction had ended.

After distilling off the solvent, a viscous polyester with an acid number of 56.7 and a OH number of 0.5 ($\overline{M}n \cong 1,940$) was obtained.

A-8

24.8 kg (400 mols) of ethylene glycol, 36 kg (400 mols) of butane-1,4-diol and 128.48 kg (880 mols) of adipic acid were charged into a 250 liter $V_2A$ kettle provided with jacket heating, an anchor stirrer, a packed column (1.5 m in height, 20 cm in diameter), a distillation bridge and a receiver. The temperature was brought to 200° C. in the course of 10 hours and during this time 25 kg of water of condensation distilled off. A water ring pump was now connected and the internal pressure was lowered stepwise, via a needle valve, to 8 mm Hg in the course of 8 hours. After a further 20 hours at 200° C./8 mm Hg, a liquid copolyester with an acid number of 58 and a OH number of 1 ($\overline{M}n \cong 1,850$) was obtained.

A-9

1,830 g (17.6 mols) of neopentylglycol, 2,077 g (17.6 mols) of hexane-1,6-diol and 5,373 g (36.8 mols) of adipic acid were subjected to a condensation reaction, analogously to A-1, to give a viscous copolyester with an acid number of 27.8 and a OH number of 1 ($\overline{M}n \cong 4,000$).

A-10

58.4 g (0.4 mol) of adipic acid were mixed with 3,660 g (26.4 mols) of ε-caprolactone and 0.8 g of titanic acid tetrabutyl ester and the mixture was heated to 200° C. whilst covering with a blanket of nitrogen. The course of the polymerization was followed by measuring the refractive index at 50° C. This index was constant after 47 hours. Small amounts of residual monomer were removed at 120° C./1 mm Hg. A poly-ε-caprolactone with an acid number of 11.4 ($\overline{M}n \cong 9,800$) was obtained.

A-11

2,500 g of a commercially available poly-(tetramethylene oxide) glycol ($\overline{M}n \cong 2,000$; Teracoll-200 from du Pont) were mixed with 370 g of phthalic anhydride and the mixture was stirred for 6 hours at 140° C. under nitrogen. A poly-(tetramethylene oxide) glycol with—COOH end groups and an acid number of 49 ($\overline{M}n \cong 2,300$) was obtained.

A-12

4,880 g (40 mols) of thiodiglycol were mixed with 20 g of phosphorous acid and the mixture was heated under nitrogen. Above 150° C., water of condensation started to distil off through a column. After two hours at 180° C., the supply of nitrogen was ceased and the pressure was gradually lowered to 15 mm Hg. After a further 30 hours at 180° C. and under 15 mm Hg, the condensation reaction had ended. A polythioether with a OH number of 70, corresponding to an average molecular weight $\overline{M}n$ of 1,600, was obtained.

92 g of phthalic anhydride were added to 500 g of this polythioether and the mixture was stirred under nitrogen for 4 hours at 138° C. A polythioether with—COOH end groups and an acid number of 58 ($\overline{M}n=1,930$) was obtained.

A-13

1,800 g (20 mols) of butane-1,4-diol were mixed with 600 g of paraformaldehyde (corresponding to about 20 mols of paraformaldehyde) and 3 g of p-toluenesulphonic acid. After adding 1 liter of benzene, the mixture was heated to a boil and the water, which distills off as an azeotrope, was separated off via a water separator. After 20 hours, the condensation reaction had ended. The reaction mixture was stirred, whilst still hot, with 10 g of powdered barium carbonate. After filtering off the solid, the solvent was distilled off under 15 mm Hg. A viscous polyformal with a OH number of 168 ($\overline{M}n=668$) was obtained.

500 g of this polyformal were mixed with 151 g of succinic anhydride and the mixture was stirred under nitrogen for 2 hours at 124° C. A polyformal with—COOH end groups and an acid number of 118 ($\overline{M}n=950$) was thus obtained.

A-14

2,500 g of a commercially available aliphatic polycarbonate of hexane-1,6-diol with an average $\overline{M}n$ of 2,000 (Desmophen 2020 from Bayer AG) were mixed with 200 g of phthalic anhydride and 5 g of maleic anhydride. After stirring for one hour t 140° C., a further 161 g of phthalic anhydride were added to the mixture. After stirring for 9 hours at 140° C., the mixture was cooled to room temperature. A hexane-1,6-diol polycarbonate with—COOH end groups and an acid number of 49 ($\overline{M}n=2,300$) was obtained.

In the examples which follow the relative solution viscosity $\eta_{rel}$ is defined by the viscosity of 0.5 g of polyester-polycarbonate in 100 ml of methylene chloride at 25° C.; the tear strength and the elongation at break are determined in accordance with DIN 53,455.

Tests by gel permeation chromatography were carried out at room temperature in tetrahydrofurane using Styragel columns (separation range: $1.5 \times 10^5$ Å, $1 \times 10^5$ Å, $3 \times 10^4$ Å and $2 \times 10^3$ Å). Standardization with bisphenol A polycarbonate was used for the determination. No major deviations compared with the $\overline{M}w$ determined by the light scattering method were found.

Differential thermal analysis (DTA) was carried out using the "Du Pont, Model 900" apparatus. For determination of the glass transition point, the approximate center of the softening range determined by the tangent method was chosen and for the crystallite melting point the approximate center of the endothermic peak of the melting point curve was chosen.

EXAMPLE 1

91.3 parts by weight of 2,2-bis-(4-hydroxyphenyl)propane are dissolved in 32 parts by weight of sodium hydroxide and 800 parts by weight of distilled water. A solution of 101.7 parts by weight of polyester A 1, which has —COOH end groups, and 1,850 parts by weight of methylene chloride are added to this solution. 119 parts by weight of phosgene are passed into the mixture in the course of 1 hour, at 20–25° C., while stirring and under a nitrogen atmosphere. While the phosgene is being passed in, 296 parts by weight of 45% strength sodium hydroxide solution are at the same time added dropwise at such a rate that the pH value remains constant at pH 13. After passing in the phosgene, 0.4 part by weight of triethylamine is added and the mixture is stirred for 30 minutes. After adjusting the pH to 7–8, the organic phase is separated off and washed successively with 2% strength phosphoric acid and finally with distilled water until it is free from electrolyte. After separating off the water, the organic phase is divided and worked up by the following processes:

(1a) A high per cent strength polymer solution is obtained by distilling off the methylene chloride until a certain concentration is reached or by adding chlorobenzene to the organic phase and distilling off all of the methylene chloride. On subsequent slow evaporation of the residual methylene chloride, or of the chlorobenzene, the polyester-polycarbonate gels and can be further worked up to give a powder/granule mixture. The polyester-polycarbonate is dried for 48 hours at 50° C. and for 24 hours at 100° C. in vacuo.

(1b) A finely divided solid product is obtained by distilling off the solvent and drying the residue in a vacuum drying cabinet and subsequently grinding.

(1c) By precipitating the polymer from solution with, for example, methanol, ethanol, acetone or aliphatic or cycloaliphatic hydrocarbons and subsequently drying in a vacuum drying cabinet.

(1d) When the polyester-polycarbonate is worked up by means of a concentration and devolatilization extruder, $\eta_{rel} = 1.62$. The mechanical properties of a film cast from methylene chloride are:

tear strength: 32.8 (MPa)
elongation at break: 385 (%)

According to differential thermal analysis (DTA), the glass transition point of the polyester constituent of the granulated product is $-36°$ C. and the crystallite melting point of the crystalline polycarbonate constituent of the said product is about 190° C. The enthalpy of melting of the crystalline polycarbonate constituent is between about 10.46–23.01 kJ/kg of polymer.

EXAMPLE 2

91.3 parts by weight of 2,2-bis-4-hydroxyphenyl)propane are dissolved in 32 parts by weight of sodium hydroxide and 800 parts by weight of distilled water.

A solution of 101.7 parts by weight of the polyester according to A 2, which has —COOH end groups, and 1,850 parts by weight of methylene chloride are added to this solution. 119 parts by weight of phosgene are passed into the mixture in the course of 1 hours, at 20–25° C., while stirring and under a nitrogen atmosphere, and a constant pH value of 13 is maintained by, at the same time, adding 289 parts by weight of 45% strength sodium hydroxide solution dropwise. After passing in the phosgene, 0.4 part by weight of triethylamine is added. The batch becomes more viscous. After 30 minutes, the organic phase is separated off and the polyester-polycarbonate is isolated as described in Example 1 (working up according to 1b). $\eta_{rel}$ of the polyester-polycarbonate is 1.30.

The mechanical properties of a film cast from methylene chloride are:

tear strength: 26.6 (MPa)
elongation at break: 323 (%)

According to DTA, the glass transition point of the polyester part of the granulated product is −36° C. and the crystallite melting point of the crystalline polycarbonate part of the said product is about 205° C. The enthalpy of melting of the crystalline polycarbonate constituent corresponds to that in Example 1.

EXAMPLE 3

91.3 parts by weight of 2,2-bis-(4-hydroxyphenyl)-propane are dissolved in 32 parts by weight of sodium hydroxide and 800 parts by weight of distilled water. A solution of 101.7 parts by weight of the polyester according to A3, which has —COOH end groups, and 1,850 parts by weight of methylene chloride are added to this solution. 128 parts by weight of phosgene are passed into the mixture in the course of 1 hour, at 20–25° C., while stirring and under a nitrogen atmosphere, while, at the same time, 340 parts by weight of 45% strength sodium hydroxide solution are added dropwise in order to keep the pH constant at 13. After passing the phosgene, 0.4 part by weight of triethylamine is added. The batch becomes more viscous. After 30 minutes, the organic phase is separated off and the polyester-polycarbonate is isolated as described in Example 1 (working up according to 1a).

$\eta_{rel}$ of the polyester-polycarbonate is 1.63. According to DTA, the glass transition point of the polyester constituent of the granulated product is −38° C. and the crystallite melting point of the polycarbonate part of the said product is about 189–190° C.

The enthalpy of melting of the crustalline polycarbonate constituent corresponds to that in Example 1.

EXAMPLE 4

228.3 parts by weight of 2,2-bis-(4-hydroxyphenyl)-propane are dissolved in 178 parts by weight of 45% strength sodium hydroxide solution and 3,000 parts by weight of distilled water. A solution of 1.685 parts by weight of 1,4-bis-(4',4''-dihydroxytriphenylmethyl)-benzene and 15 parts by weight of 5% strength sodium hydroxide solution is added to this solution and a solution of 254.3 parts by weight of polyester A-4, which has —COOH end groups, and 5,000 parts by weight of methylene chloride are then added to the mixture. 419 parts by weight of phosgene are passed into the mixture in the course of 2 hours, at 20–25° C., while stirring and under a nitrogen atmosphere, while, at the same time, 1,184 parts by weight of 45% strength sodium hydroxide solution are added dropwise in order to keep the pH constant at 13. After passing in the phosgene, 1.08 parts by weight of triethylamine are added. The batch becomes more viscous. After 30 minutes, the organic phase is separated off and the polyester-polycarbonate is isolated as described in Example 1 (working up according to 1c).

$\eta_{rel}$ of the polyester-polycarbonate is 1.53. According to determination of molecular weight by gel permeation chromatography, the polymer has a maximum* at 54,000. The mechanical properties of a film cast from methylene chloride are:

tear strength: 25.9 (MPa)
elongation at break: 410 (%) 6 *) Maximum, mentioned in the Examples, means greatest number of macromolecules.

According to DTA, the glass transition point of the polyester part of the granulated product is −36° C. and the crystallite melting point of the crystalline polycarbonate constituent of the said product is about 205° C. The enthalpy of melting of the crystalline polycarbonate constituent corresponds to that in Example 1.

EXAMPLE 5

182.6 parts by weight of 2,2-bis-(4-hydroxyphenyl)-propane are dissolved in 142 parts by weight of 45% strength sodium hydroxide solution and 3,000 parts by weight of distilled water. A solution of 1.08 parts by weight of 1,4-bis-(4',4''-dihydroxytriphenylmethyl)-benzene and 9.8 parts by weight of 5% strength sodium hydroxide solution is added to this solution and a solution of 203.4 parts by weight of polyester A-5, which has —COOH end groups, and 5,000 parts by weight of methylene chloride are then added to the mixture. 248.7 parts by weight of phosgene are passed into the mixture in the course of 1¼ hours, at 20–25° C., while stirring and under a nitrogen atmosphere, while, at the same time, 680 parts by weight of 45% strength sodium hydroxide solution are added dropwise in order to keep the pH constant at 13. After passing in the phosgene, 0.81 part by weight of triethylamine is added. The batch becomes more viscous. After 30 minutes the organic phase is separated off and the polyester-polycarbonate is isolated as described in Example 1 (working up according to 1a).

$\eta_{rel}$ of the polyester-polycarbonate is 1.42.

According to determination of molecular weight by gel permeation chromatography, the polymer has a maximum at The mechanical properties of a film cast from methylene chloride are:

tear strength: 48.8 (MPa)
elongation at break: 431 (%)

according to DTA, the glass transition point of the soft segment of the granulated product is −29° C. and the crystallite melting point of the crystalline polycarbonate part of the said product is about 200° C. The enthalpy of melting of the crystalline polycarbonate constituent corresponds to that in Example 1.

EXAMPLE 6

182.6 parts by weight of 2,2-bis-(4-hydroxyphenyl)-propane are dissolved in 142 parts by weight of 45% strength sodium hydroxide solution and 3,000 parts by weight of distilled water. A solution of 1.08 parts by weight of 1,4-bis-(4',''-dihydroxytriphenylmethyl)-benzene and 9.8 parts by weight of 5% strength sodium hydroxide solution is added to this solution and a solution of 203.4 parts by weight of polyester A-6, which has —COOH end groups, and 5,000 parts by weight of methylene chloride are then added to the mixture. 254.3 parts by weight of phosgene are passed into the mixture in the course of 1½ hours, at 20–25° C., while stirring and under a nitrogen atmosphere, while, at the same time, 740 parts by weight of 45% strength sodium hydroxide solution are added dropwise in order to keep the pH constant at 13. After passing in the phosgene, 0.81 part by weight of triethylamine is added. The batch becomes more viscous. After 30 minutes, the organic phase is separated off and the polyester-polycarbonate is isolated as described in Example 1 (working up according to 1a).

$\eta_{rel}$ of the polyester-polycarbonate is 1.37.

According to determination of molecular weight by gel permeation chromatography, the polymer has a maximum at 32,800.

The mechanical properties of a film cast from methylene chloride are:
tear strength: 43.2 (MPa)
elongation at break: 397 (%)

According to DTA, the glass transition point of the soft segment of the granulated product is −27° C. and the crystallite melting point of the crystalline polycarbonate part of the said product is about 245° C. The enthalpy of melting of the crystalline polycarbonate constituent corresponse to that in Example 1.

EXAMPLE 7

228.3 parts by weight of 2,2-bis-(4-hydroxyphenyl)-propane are dissolved in 178 parts by weight of 45% strength sodium hydroxide solution and 3,000 parts by weight of distilled water. A solution of 1.685 parts by weight of 1,4-bis-(4',4"-dihydroxytriphenylmethyl)-benzene and 15 parts by weight of 5% strength sodium hydroxide solution is added to this solution and a solution of 254.3 parts by weight of polyester A-7, which has —COOH end groups, and 5,000 parts by weight of methylene chloride are then added to the mixture. 310.5 parts by weight of phosgene are passed into the mixture in the course of 2 hours, at 20-25° C., with stirring and under a nitrogen atmosphere, while, at the same time, 755 parts by weight of 45% strength sodium hydroxide solution are added dropwise in order to keep the pH constant at 13. After passing in the phosgene, 0.101 part by weight of triethylamine is added. The batch becomes more viscous. After 30 minutes the organic phase is separated off and the polyester-polycarbonate is isolated as described in Example 1 (working up according to 1a).

$\eta_{rel}$ of the polyester-polycarbonate is 1.580.

According to determination of molecular weight by gel permeation chromatography, the polymer has a maximum at 38,000. The mechanical properties of a film cast from methylene chloride are:
tear strength: 35.9 (MPa)
elongation at break: 360 (%)

According to DTA, the glass transition point of the polyester in the granulated product is −26° C. and the crystallite melting point of the crystalline polycarbonate part of the said product is about 190° C. The enthalpy of melting of the crystalline polycarbonate constituent corresponds to that in Example 1.

Example 8

228.3 parts by weight of 2,2-(bis-(4-hydroxyphenyl)-propane are dissolved in 178 parts by weight of 45% strength sodium hydroxide solution and 3,000 parts by weight of distilled water. A solution of 1.685 parts by weight of 1,4-bis-(4',4"-dihydroxytriphenylmethyl)-benzene and 15 parts by weight of 5% strength sodium hydroxide solution is added to this solution and a solution of 254.3 parts by weight of polyester A-8, which has —COOH end groups, and 5,000 parts by weight of methylene chloride are then added to the mixture. 313.5 parts by weight of phosgene are passed into the mixture in the course of 2 hours, at 20-25° C., with stirring and under a nitrogen atmosphere, while, at the same time, 814 parts by weight of 45% strength sodium hydroxide solution are added dropwise in order to keep the pH constant at 13. After passing in the phosgene, 0.101 part by weight of triethylamine is added. The batch becomes more viscous. After 30 minutes the organic phase is separated off and the polyester-polycarbonate is isolated as described in Example 1 (working up according to 1a).

$\eta_{rel}$ of the polyester-polycarbonate is 1.36.

According to determination of molecular weight by gel permeation chromatography, the polymer has a maximum at 38,000. According to DTA, the glass transition point of the polyester in the granulated product is −41° C. and the crystallite melting point of the crystalline polycarbonate part of the said product is about 185° C. The enthalpy of melting of the crystalline polycarbonate constituent corresponds to that in Example 1.

EXAMPLE 9

182.6 parts by weight of 2,2-bis-(4-hydroxyphenyl)-propane are dissolved in 142 parts by weight of 45% strength sodium hydroxide solution and 3,000 parts by weight of distilled water. A solution of 203.4 parts by weight of polyester A-9, which has —COOH end groups, and 5,000 parts by weight of methylene chloride are added to this solution. 222.7 parts by weight of phosgene are passed into the mixture in the course of 1 hour, at 20°-25° C., while stirring and under a nitrogen atmosphere, while, at the same time, 592 parts by weight of 45% strength sodium hydroxide solution are added dropwise in order to keep the pH constant at 13. After passing in the phosgene, 0.82 part by weight of triethylamine is added. The batch becomes more viscous. After 30 minutes the organic phase is separated off and the polyester polycarbonate is isolated as described in Example 1 (working up according to 1d).

$\eta_{rel}$ of the polyester-polycarbonate is 1.82.

According to determination of molecular weight by gel permeation chromatography, the polymer has a maximum at 93,000. The mechanical properties of a film cast from methylene chloride are:
tear strength: 43.7 (MPa)
elongation at break: 381 (%)

According to DTA, the glass transition point of the polyester part of the granulated product is −37° C., the glass transition point of the amorphous polycarbonate part of the said product is 125° C. and the crystallite melting point of the crystalline polycarbonate part of the said product is about 195° C. The enthalpy of melting of the crystalline polycarbonate constituent corresponds to that in Example 1.

EXAMPLE 10

143.6 parts by weight of 2,2-bis-(4-hydroxyphenyl)-propane and 4.72 parts by weight of p-tert.-butylphenol are dissolved in 111.8 parts by weight of 45% strength sodium hydroxide solution and 3,000 parts by weight of distilled water. A solution of 160 parts by weight of polycaprolactone A-10 which has —COOH end groups and 5,000 parts by weight of methylene chloride are added to this solution. 163.7 parts by weight of phosgene are passed into the mixture in the course of 45 minutes, at 20°-25° C., while stirring and under a nitrogen atmosphere, while, at the same time, 399.6 parts by weight of 45% strength sodium hydroxide solution are added dropwise in order to keep the pH constant at 13. After passing in the phosgene, 0.66 part by weight of triethylamine is added. The batch becomes more viscous. After 1 hour the organic phase is separated off and the polyester-polycarbonate is isolated as described in Example 1 (working up according to 1a).

$\eta_{rel}$ of the polyester-polycarbonate is 1.460.

According to determination of molecular weight by gel permeation chromatography, the polymer has a maximum at 32,800. The mechanical properties of a film cast from methylene chloride are:

tear strength: 47.9 (MPa)

elongation at break: 488 (%)

According to DTA, the glass transition point of the polycaprolactone in the granulated product is −10° C. and the crystallite melting point of the crystalline polycarbonate part of the said product is about 240° C. The enthalpy of melting of the crystalline polycarbonate constituent corresponds to that in Example 1.

EXAMPLE 11

228.3 parts by weight of 2,2-bis-(4-hydroxyphenyl)-propane are dissolved in 178 parts by weight of 45% strength sodium hydroxide solution and 3,000 parts by weight of distilled water. A solution of 1.685 parts by weight of 1,4-bis-(4',4''-dihydroxytriphenylmethyl)-benzene and 15 parts by weight of 5% strength sodium hydroxide solution is added to this solution and a solution of 254.3 parts by weight of polyether A-11, which has —COOH end groups, and 5,000 parts by weight of methylene chloride are then added to the mixture.

314.5 parts by weight of phosgene are passed into the mixture in the course of 2 hours, at 20°–25° C., while stirring and under a nitrogen atmosphere, while, at the same time, 700 parts by weight of 45% strength sodium hydroxide solution are added dropwise in order to keep the pH constant at 13. After the phosgene has been passed in, 0.101 part by weight of triethylamine is added. The batch becomes more viscous. After 30 minutes the organic phase is separated off and the polyester-polycarbonate is isolated as described in Example 1 (working up according to 1a).

$\eta_{rel}$ of the polyester-polycarbonate is 1.37.

According to determination of molecular weight by gel permeation chromatograhy, the polymer has a maximum at 44,000. The mechanical properties of a film cast from methylene chloride are:

tear strength: 11.1 (MPa)

elongation at break: 215 (%)

According to DTA, the glass transition temperature of the soft segment of the granulated product is −75° C. and the crystallite melting point of the crystalline polycarbonate constituent of the said product is about 200° C. The enthalpy of melting of the crystalline polycarbonate constituent corresponds to that in Example 1.

EXAMPLE 12

11.41 parts by weight of 2,2-bis-(4-hydroxyphenyl)-propane are dissolved in 0.4 part by weight of sodium hydroxide and 170 parts by weight of distilled water. A solution of 12.7 parts by weight of polythioether A-12, which has —COOH end groups, and 225 parts by weight of methylene chloride are added to this solution. 15.4 parts by weight of phosgene are passed into the mixture in the course of 20 minutes, at 20°–25° C., while stirring and under a nitrogen atmosphere, while, at the same time, 45 parts by weight of 45% strength sodium hydroxide solution are added dropwise in order to keep the pH constant at 13. After passing in the phosgene, 0.051 part by weight of triethylamine is added. The batch becomes more viscous. After 30 minutes the organic phase is separated off and the polyester-polycarbonate is isolated as described in Example 1a.

$\eta_{rel}$ of the polyester-polycarbonate is 1.25.

EXAMPLE 13

11.41 parts by weight of 2,2-bis-(4-hydroxyphenyl)-propane are dissolved in 0.4 part by weight of sodium hydroxide and 170 parts by weight of distilled water. A solution of 12.7 parts by weight of polyacetal A-13 ($\overline{M}n$ about 1,020), which has —COOH end groups, and 225 parts by weight of methylene chloride are added to this solution. 18.3 parts by weight of phosgene are passed into the mixture in the course of 22 minutes, at 20°–25° C., while stirring and under a nitrogen atmosphere, while, at the same time 52 parts by weight of 45% strength sodium hydroxide solution are added dropwise in order to keep the pH constant at 13. After passing in the phosgene, 0.051 part by weight of triethylamine is added. The batch becomes more viscous. After 30 minutes the organic phase is separated off and the polyester-polycarbonate is isolated as described in Example 1a.

$\eta_{rel}$ of the polyester-polycarbonate is 1.26.

EXAMPLE 14

182.6 parts by weight of 2,2-bis-(4-hydroxyphenyl)-propane are dissolved in 142 parts by weight of 45% strength sodium hydroxide solution and 3,000 parts by weight of distilled water. A solution of 1.08 parts by weight of 1,4-bis-(4',4''-dihydroxytriphenylmethyl)-benzene and 9.8 parts by weight of 5% strength sodium hydroxide solution is added to this solution and a solution of 203.4 parts by weight of the aliphatic polycarbonate A-14, which has —COOH end groups, and 5,000 parts by weight of methylene chloride are then added to the mixture. 249.7 parts by weight of phosgene are passed into the mixture in the course of 1¼ hours, at 20°–25° C., while stirring and under a nitrogen atmosphere, while, at the same time, 680 parts by weight of 45% strength sodium hydroxide solution are added dropwise in order to keep the pH constant at 13. After passing in phosgene, 0.81 part by weight of triethylamine is added. The batch becomes more viscous. After 30 minutes the organic phase is separated off and the polyester-polycarbonate is isolated as described in Example 1 (working up according to 1a).

$\eta_{rel}$ of the polyester-polycarbonate is 1.32.

According to determination of molecular weight by gel permeation chromatography, the polymer has a maximum at 31.000. The mechanical properties of a film cast from methylene chloride are:

tear strength: 43.8 (MPa)

elongation at break: 313 (%)

According to DTA, the glass transition point of the soft segment of the granulated product is −20° C. and the crystallite melting point of the crystalline polycarbonate part of the said product is about 250° C. The enthalpy of melting of the crystalline polycarbonate constituent corresponds to that in Example 1.

COMPARISON EXAMPLE 13.7 parts by weight of 2,2-bis-(4-hydroxyphenyl)-propane are dissolved in 4.8 parts by weight of sodium hydroxide and 140 parts by weight of distilled water. A suspension of 5.84 parts by weight of adipic acid and 185 parts by weight of methylene chloride are added to this solution and, under these conditions, the adipic acid goes into solution. 34.5 parts by weight of phosgene are passed into the mixture in the course of 30 minutes, at 20°–25° C., while stirring and under a nitrogen atmosphere, while, at the same time 118 parts by weight of 45% strength sodium hydroxide solution are added dropwise in order to keep the pH constant at 13. After passing in phosgene, 0.101 part by weight of triethylamine is added. The batch becomes more vicous. After 30 minutes the organic phase is separated from the aqeuous alkaline phase. The organic phase is acidified and then washed with water until the neutral point is reached.

The reaction product is then precipitated with methanol. The IR spectrum of this product is completely identical to a comparison spectrum of 2,2-bis-(4-hydroxyphenyl-propane polycarbonate and shows no further bands.

The aqueous-alkaline phase is acidified with dilute phosphoric acid. After purifying the drying, 3.5 parts by weight of unconverted adipic acid are recovered.

Although the invention has been described in detail for the purpose of illustration, it is to be understood that such detail is solely for that purpose and that variations can be made therein by those skilled in the art without departing from the spirit and cope of the invention except as it may be limited by the claims.

What is claimed is:

1. A process for the production of a high-molecular weight, polyester-polycarbonate which can be processed by thermoplastic methods, comprising reacting segments which contain carboxyl groups and have average molecular weights $\overline{M}n$ of greater than about 600 with one or more bisphenols, phosgene and about 0.2–5 mol %, relative to the mol amount of bisphenols, of a tertiary aliphatic amine by the two-phase boundary polycondensation process at a pH value of between about 9 and 14 and at a temperature of between about 0° C. and 80° C.

2. A process according to claim 1, in which the segments which contain carboxyl groups have a $\overline{M}n$ greater than about 800.

3. A process according to claim 1, in which the segments which contain carboxyl groups have a $\overline{M}n$ of between about 1,000 and 20,000.

4. A process according to claim 1, in which the two-phase boundary polycondensation process is carried out at a temperature of between about 15° C. and 40° C.

5. A process according to claim 1, in which the carboxyl-containing segments have 2-COOH groups.

6. A process for the production of a high-molecular weight, polyester-polycarbonate which can be processed by thermoplastic methods comprising:

(a) reacting segments which contain carboxyl groups having a number average molecular weight, $\overline{M}n$, of greater than about 600 with diphenols, phosgene and about 0.2–5 mol %, relative to the mol amount of diphenols, of a tertiary aliphatic amine by a two-phase boundary condensation process at a pH value of between about 9 and 14 and at a temperature of between about 0° C. and 80° C. to form a solution of the polyester-polycarbonate, and (b) isolating the polyester-polycarbonate from the solution.

7. The process of claim 6 wherein the polyester-polycarbonate having incorporated segments containing carboxyl groups has a weight-average molecular weight, $\overline{M}n$, of about 25,000 to 200,000.

8. A process for the production of a high-molecular weight, polyester-polycarbonate which can be processed by thermoplastic methods comprising:

(a) reacting segments which contain carboxyl groups having a number average molecular weight, $\overline{M}n$, of greater than about 600 which are selected from the group of compounds consisting of (i) polyesters containing —COOH groups, (ii) polyethers containing at least one hydroxyl group per molecule which have been acylated with cyclic dicarboxylic acid anhydrides, (iii) polythioethers containing at least one hydroxyl group per molecule which have been acylated with cyclic dicarboxylic acid anhydrides, (iv) polyacetals containing at least one hydroxyl group per molecule which have been acylated with cyclic dicarboxylic acid anhydrides, and (v) aliphatic polycarbonates containing at least one hydroxyl group per molecule which have been acylated with cyclic dicarboxylic acid anhydrides, with diphenols, phosgene and about 0.2–5 mole %, relative to the mol amount of diphenols, of a tertiary aliphatic amine by a two-phase boundary condensation process at a pH value of between about 9 and 14 and at a temperature of between about 0° C. and 80° C. to form a solution of the polyester-polycarbonate, and (b) isolating the polyester-polycarbonate from the solution.

* * * * *

UNITED STATES PATENT AND TRADEMARK OFFICE
CERTIFICATE OF CORRECTION

PATENT NO. : 4,169,868

DATED : October 2, 1979

INVENTOR(S) : Manfred Schreckenberg, et al.

It is certified that error appears in the above—identified patent and that said Letters Patent is hereby corrected as shown below:

The term of this patent subsequent to April 1, 1997 has been disclaimed.

Signed and Sealed this

Seventh Day of September 1982

[SEAL]

Attest:

GERALD J. MOSSINGHOFF

Attesting Officer   Commissioner of Patents and Trademarks